(No Model.)
J. TURNER.
SULKY PLOW.
No. 245,587. Patented Aug. 9, 1881.
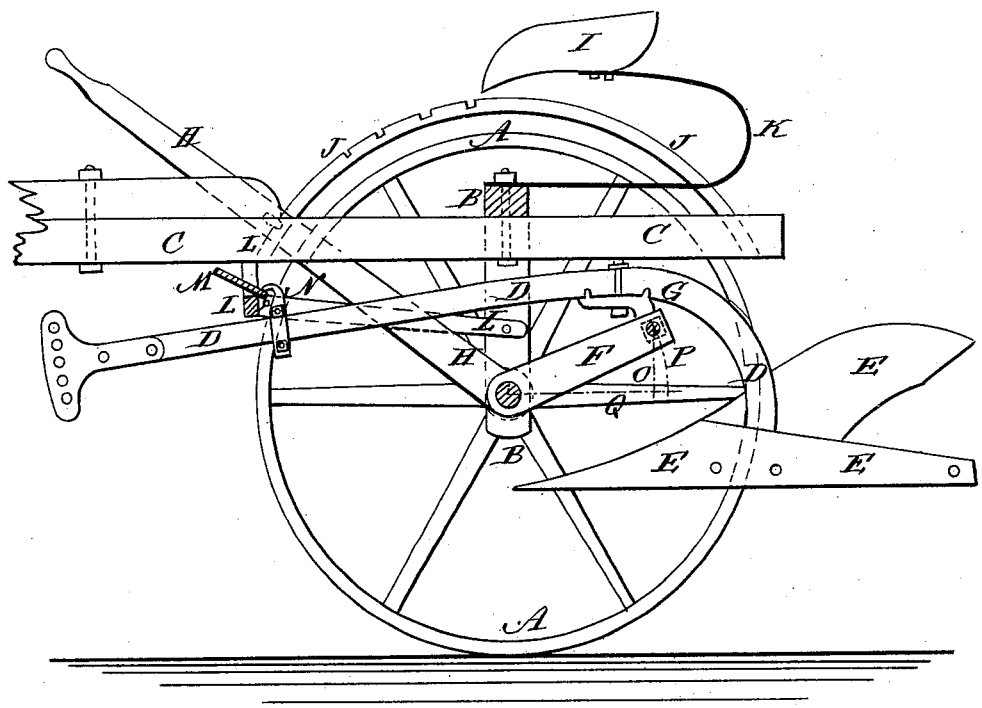
WITNESSES:
C. Neveux
C. Sedgwick
INVENTOR:
J. Turner
BY Munn &Co
ATTORNEYS.

UNITED STATES PATENT OFFICE.

JOHN TURNER, OF SPRINGFIELD, ILLINOIS, ASSIGNOR TO C. R. & C. W. POST, OF SAME PLACE.

SULKY-PLOW.

SPECIFICATION forming part of Letters Patent No. 245,587, dated August 9, 1881.

Application filed June 9, 1881. (No model.)

*To all whom it may concern:*

Be it known that I, JOHN TURNER, of Springfield, Sangamon county, Illinois, have invented a new and useful Improvement in Beam-Locking Attachments for Sulky-Plows, of which the following is a specification.

The drawing is a sectional side elevation of a sulky-plow to which my improvement has been applied.

The object of this invention is to lock the forward end of the plow-beam of a sulky-plow automatically when the plow is raised from the ground.

The invention consists in the combination, with the forward part of the plow-beam, of a hook or catch to engage with the foot-rest or a catch attached thereto, whereby the said forward end of the plow-beam will be locked in place as the plow is raised and unlocked as the plow is lowered, as will be hereinafter fully described.

A represents the wheel, B the arched axle, and C the frame, of a sulky-plow. D is the plow-beam. E is the plow, and F is the bail or bent bar to which the plow-beam D, at or near its middle part, is hinged by a coupling, G. The ends of the bent bar or bail F are hinged to the lower parts of the arched axle B.

To an arm of the bent bar or bail E is rigidly attached, or upon it is formed, a lever, H, which projects into such a position that it can be readily reached and operated by the driver from his seat I to raise and lower the plow D E. The lever H is held in any position into which it may be adjusted by an arched catch-bar, J, attached to the frame C.

The driver's seat I is attached to a spring-support, K, which is secured to the axle B.

To the frame C and axle B is attached a bar or brace, L, to which is secured the foot-rest M.

As thus described there is nothing new in the construction.

With this construction, when the lever H is operated to raise the plow from the ground the forward end of the plow-beam D rises first until it strikes the foot-rest supporting-bar L and is stopped, and the rear end of the beam D is then raised into place. When the plow is thus suspended the weight of the double-tree and single-trees, when the tugs or traces are slackened, draws the forward end of the plow-beam D downward, allowing the single-trees to strike the horse's heels. To prevent this I clamp or otherwise secure to the beam B a hook, N, which, as the beam D moves forward when being raised, as indicated by the dotted lines O P Q in the drawing, engages with the foot-rest M and locks the plow-beam D securely in place. As the plow-beam D moves to the rearward when the plow is being lowered the hook end is withdrawn from the foot-rest M. With this construction the hook N locks and unlocks the forward end of the plow-beam automatically as the plow is raised and lowered, and the plow is raised and lowered with as much ease as though the locking attachment were not used.

If desired, the hook N can be attached to the foot-rest M or its supporting-bar L, and a staple or eyebolt attached to the plow-beam, to be passed on and off the said hook as the plow-beam moves forward and rearward when the plow is raised and lowered; or other catches can be attached to the beam, or to the beam and foot-rest, to engage and disengage automatically as the plow is raised and lowered.

Having thus described my invention, I claim as new and desire to secure by Letters Patent—

The combination, with the forward part of the plow-beam D of a sulky-plow, of a hook or catch, N, to engage with the foot-rest M or a catch attached thereto, substantially as herein shown and described, whereby the said forward end of the plow-beam will be locked in place as the plow is raised and unlocked as the plow is lowered, as set forth.

JOHN TURNER.

Witnesses:
HENRY C. LATHAM,
CHARLES S. KIDD.